US010001778B2

(12) United States Patent
Hu et al.

(10) Patent No.: US 10,001,778 B2
(45) Date of Patent: Jun. 19, 2018

(54) VELOCITY CONTROL FOR AN UNMANNED AERIAL VEHICLE

(71) Applicant: SZ DJI TECHNOLOGY Co., LTD, Shenzhen (CN)

(72) Inventors: Xiao Hu, Shenzhen (CN); Ang Liu, Shenzhen (CN); Guyue Zhou, Shenzhen (CN); Xuyang Pan, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days. days.

(21) Appl. No.: 15/277,455

(22) Filed: Sep. 27, 2016

(65) Prior Publication Data

US 2017/0052541 A1 Feb. 23, 2017

Related U.S. Application Data

(63) Continuation of application No. 15/088,551, filed on Apr. 1, 2016, now Pat. No. 9,625,909, which is a
(Continued)

(51) Int. Cl.
*G05D 1/00* (2006.01)
*G08G 5/00* (2006.01)
(Continued)

(52) U.S. Cl.
CPC ......... *G05D 1/0088* (2013.01); *B64C 39/024* (2013.01); *G05D 1/0011* (2013.01);
(Continued)

(58) Field of Classification Search
CPC ............ G08G 5/00; G08G 13/00; G05D 1/00
See application file for complete search history.

(56) References Cited

U.S. PATENT DOCUMENTS 5,173,947 A    12/1992   Chande et al.
5,631,640 A     5/1997   Deis et al.
(Continued)

FOREIGN PATENT DOCUMENTS

CA       2830009 A1   6/2014
CN    101403620 A   4/2009
(Continued)

OTHER PUBLICATIONS

Notice of allowance dated Feb. 28, 2017 for U.S. Appl. No. 14/801,599.
(Continued)

*Primary Examiner* — Yonel Beaulieu
(74) *Attorney, Agent, or Firm* — Anova Law Group, PLLC

(57) ABSTRACT

Systems and methods for controlling an unmanned aerial vehicle within an environment are provided. In one aspect, a system comprises one or more sensors carried on the unmanned aerial vehicle and configured to receive sensor data of the environment and one or more processors. The one or more processors may be individually or collectively configured to: determine, based on the sensor data, an environmental complexity factor representative of an obstacle density for the environment; determine, based on the environmental complexity factor, one or more operating rules for the unmanned aerial vehicle; receive a signal indicating a desired movement of the unmanned aerial vehicle; and cause the unmanned aerial vehicle to move in accordance with the signal while complying with the one or more operating rules.

20 Claims, 11 Drawing Sheets

Related U.S. Application Data continuation of application No. 14/801,599, filed on Jul. 16, 2015, now Pat. No. 9,625,907, which is a continuation of application No. PCT/CN2014/086005, filed on Sep. 5, 2014.

(51) Int. Cl.
| | | |
|---|---|---|
| *G05D 13/00* | (2006.01) | |
| *B64C 39/02* | (2006.01) | |
| *G05D 1/04* | (2006.01) | |
| *G08G 5/04* | (2006.01) | |
| *G05D 1/10* | (2006.01) | |

(52) U.S. Cl.
CPC .............. *G05D 1/042* (2013.01); *G05D 1/102* (2013.01); *G05D 13/00* (2013.01); *G08G 5/0069* (2013.01); *G08G 5/04* (2013.01); *G08G 5/045* (2013.01); *B64C 2201/141* (2013.01); *B64C 2201/146* (2013.01)

(56) References Cited

U.S. PATENT DOCUMENTS

| | | |
|---|---|---|
| 5,682,229 A | 10/1997 | Wangler |
| 5,716,032 A | 2/1998 | McIngvale |
| 5,785,281 A | 7/1998 | Peter et al. |
| 6,056,237 A | 5/2000 | Woodland |
| 6,122,572 A | 9/2000 | Yavnai |
| 6,377,875 B1 | 4/2002 | Schwaerzler |
| 6,377,889 B1 | 4/2002 | Soest |
| 6,597,987 B1 | 7/2003 | Barton |
| 6,661,918 B1 | 12/2003 | Gordon et al. |
| 6,804,607 B1 | 10/2004 | Wood |
| 6,985,810 B2 | 1/2006 | Moitra et al. |
| 7,107,148 B1 | 9/2006 | Bodin et al. |
| 7,130,741 B2 | 10/2006 | Bodin et al. |
| 7,158,877 B2 | 1/2007 | Carlsson et al. |
| 7,195,200 B2 | 3/2007 | Yamane |
| 7,228,232 B2 | 6/2007 | Bodin et al. |
| 7,231,294 B2 | 6/2007 | Bodin et al. |
| 7,242,791 B2 | 7/2007 | Han et al. |
| 7,266,477 B2 | 9/2007 | Foessel et al. |
| 7,302,316 B2 | 11/2007 | Beard et al. |
| 7,431,243 B1 | 10/2008 | Allen |
| 7,494,320 B2 | 2/2009 | Muren |
| 7,512,462 B2 | 3/2009 | Nichols et al. |
| 7,571,051 B1 | 8/2009 | Shulman |
| 7,606,115 B1 | 10/2009 | Cline et al. |
| 7,737,878 B2 | 6/2010 | Van Tooren et al. |
| 7,747,067 B2 | 6/2010 | Popescu et al. |
| 7,792,330 B1 | 9/2010 | Lowder et al. |
| 7,979,174 B2 | 7/2011 | Fregene et al. |
| 8,072,581 B1 | 12/2011 | Breiholz |
| 8,082,102 B2 | 12/2011 | Ravenscroft |
| 8,108,092 B2* | 1/2012 | Phillips ................ G05D 1/0033 700/245 |
| 8,108,139 B1 | 1/2012 | Pylant |
| 8,116,928 B2 | 2/2012 | Wu et al. |
| 8,275,544 B1 | 9/2012 | Wells et al. |
| 8,355,834 B2 | 1/2013 | Duggan et al. |
| 8,374,786 B2 | 2/2013 | Buros |
| 8,378,881 B2 | 2/2013 | Lemire et al. |
| 8,380,425 B2 | 2/2013 | Duggan et al. |
| 8,401,225 B2 | 3/2013 | Newcombe et al. |
| 8,521,339 B2 | 8/2013 | Gariepy et al. |
| 8,538,673 B2 | 9/2013 | Sislak et al. |
| 8,543,265 B2 | 9/2013 | Ekhaguere et al. |
| 8,566,071 B2 | 10/2013 | Shumaker et al. |
| 8,666,661 B2 | 3/2014 | Higgins |
| 8,676,498 B2 | 3/2014 | Ma et al. |
| 8,711,206 B2 | 4/2014 | Newcombe et al. |
| 8,712,679 B1 | 4/2014 | Mostofi et al. |
| 8,798,922 B2 | 8/2014 | Tillotson et al. |
| 8,825,226 B1 | 9/2014 | Worley, III et al. |
| 8,868,328 B1 | 10/2014 | Estkowski |
| 8,909,391 B1 | 12/2014 | Peeters et al. |
| 8,996,207 B2 | 3/2015 | Goossen et al. |
| 9,031,782 B1 | 5/2015 | Lemay et al. |
| 9,051,043 B1 | 6/2015 | Peeters et al. |
| 9,056,676 B1 | 6/2015 | Wang |
| 9,085,354 B1 | 7/2015 | Peeters et al. |
| 9,164,506 B1 | 10/2015 | Zang |
| 9,367,067 B2 | 6/2016 | Gilmore et al. |
| 9,592,911 B2 | 3/2017 | Liu et al. |
| 9,592,912 B1 | 3/2017 | Michini et al. |
| 9,604,723 B2 | 3/2017 | Liu et al. |
| 9,625,907 B2 | 4/2017 | Hu et al. |
| 9,625,909 B2 | 4/2017 | Hu et al. |
| 2003/0055540 A1 | 3/2003 | Hansen |
| 2003/0152892 A1 | 8/2003 | Huang et al. |
| 2003/0191561 A1 | 10/2003 | Vos |
| 2004/0028258 A1 | 2/2004 | Naimark et al. |
| 2004/0167667 A1 | 8/2004 | Goncalves et al. |
| 2004/0193334 A1 | 9/2004 | Carlsson et al. |
| 2005/0004723 A1 | 1/2005 | Duggan et al. |
| 2005/0128196 A1 | 6/2005 | Popescu et al. |
| 2005/0182518 A1 | 8/2005 | Karlsson et al. |
| 2005/0238200 A1 | 10/2005 | Gupta et al. |
| 2006/0015247 A1 | 1/2006 | Speer |
| 2006/0049930 A1 | 3/2006 | Zruya et al. |
| 2006/0106506 A1 | 5/2006 | Nichols et al. |
| 2006/0147088 A1 | 7/2006 | Han et al. |
| 2006/0149472 A1 | 7/2006 | Han et al. |
| 2006/0197937 A1 | 9/2006 | Bamji et al. |
| 2006/0222207 A1 | 10/2006 | Balzer et al. |
| 2006/0235610 A1 | 10/2006 | Ariyur et al. |
| 2007/0018052 A1 | 1/2007 | Eriksson |
| 2007/0093945 A1 | 4/2007 | Grzywna et al. |
| 2007/0106473 A1 | 5/2007 | Bodin et al. |
| 2007/0156286 A1 | 7/2007 | Yamauchi |
| 2007/0193798 A1 | 8/2007 | Allard et al. |
| 2007/0252748 A1 | 11/2007 | Rees et al. |
| 2007/0280528 A1 | 12/2007 | Wellington et al. |
| 2008/0009965 A1 | 1/2008 | Bruemmer et al. |
| 2008/0027591 A1 | 1/2008 | Lenser et al. |
| 2008/0033645 A1 | 2/2008 | Levinson et al. |
| 2008/0059065 A1 | 3/2008 | Strelow et al. |
| 2008/0154490 A1 | 6/2008 | Hoofd et al. |
| 2008/0195304 A1 | 8/2008 | Krishnaswamy |
| 2008/0195316 A1 | 8/2008 | Krishnaswamy |
| 2008/0215204 A1 | 9/2008 | Roy et al. |
| 2009/0027253 A1 | 1/2009 | Van Tooren et al. |
| 2009/0157233 A1 | 6/2009 | Kokkeby et al. |
| 2009/0167761 A1 | 7/2009 | Hayashi et al. |
| 2009/0177398 A1 | 7/2009 | Belenkii et al. |
| 2009/0210109 A1 | 8/2009 | Ravenscroft |
| 2009/0213240 A1 | 8/2009 | Sim et al. |
| 2009/0234499 A1* | 9/2009 | Nielsen .................. B25J 9/161 700/250 |
| 2009/0248304 A1 | 10/2009 | Roumeliotis et al. |
| 2010/0001902 A1 | 1/2010 | Smith |
| 2010/0004798 A1 | 1/2010 | Bodin et al. |
| 2010/0017115 A1 | 1/2010 | Gautama |
| 2010/0030470 A1 | 2/2010 | Wang et al. |
| 2010/0040279 A1 | 2/2010 | Yoon et al. |
| 2010/0063651 A1 | 3/2010 | Anderson |
| 2010/0084513 A1 | 4/2010 | Gariepy et al. |
| 2010/0100269 A1 | 4/2010 | Ekhaguere et al. |
| 2010/0109945 A1 | 5/2010 | Roh |
| 2010/0198514 A1 | 8/2010 | Miralles |
| 2010/0250022 A1 | 9/2010 | Hines et al. |
| 2010/0250133 A1 | 9/2010 | Buros |
| 2010/0265126 A1 | 10/2010 | Mao |
| 2010/0280699 A1 | 11/2010 | Bageshwar et al. |
| 2010/0303340 A1 | 12/2010 | Abraham et al. |
| 2010/0304070 A1 | 12/2010 | Meles |
| 2010/0305778 A1 | 12/2010 | Dorneich et al. |
| 2010/0312917 A1 | 12/2010 | Allport |
| 2011/0054689 A1* | 3/2011 | Nielsen ................ G05D 1/0088 700/258 |
| 2011/0084162 A1 | 4/2011 | Goossen et al. |
| 2011/0106339 A1 | 5/2011 | Phillips et al. |
| 2011/0123135 A1 | 5/2011 | Hsieh et al. |

(56) References Cited

U.S. PATENT DOCUMENTS

| | | |
|---|---|---|
| 2011/0178658 A1 | 7/2011 | Kotaba et al. |
| 2011/0178669 A1 | 7/2011 | Tanaka et al. |
| 2011/0246015 A1 | 10/2011 | Cummings et al. |
| 2011/0264427 A1 | 10/2011 | Shumaker et al. |
| 2011/0282523 A1 | 11/2011 | Shue |
| 2011/0282622 A1 | 11/2011 | Canter |
| 2012/0078510 A1 | 3/2012 | Ma et al. |
| 2012/0083945 A1 | 4/2012 | Oakley et al. |
| 2012/0106800 A1 | 5/2012 | Khan et al. |
| 2012/0127030 A1 | 5/2012 | Arthur et al. |
| 2012/0154277 A1 | 6/2012 | Bar-Zeev et al. |
| 2012/0203450 A1 | 8/2012 | Meyer et al. |
| 2012/0213436 A1 | 8/2012 | Grindstaff et al. |
| 2012/0237085 A1 | 9/2012 | Meier |
| 2012/0245844 A1 | 9/2012 | Lommel et al. |
| 2012/0281503 A1 | 11/2012 | Rikoski |
| 2012/0290146 A1 | 11/2012 | Dedes et al. |
| 2013/0009950 A1 | 1/2013 | Ben-David et al. |
| 2013/0050180 A1 | 2/2013 | Bruemmer |
| 2013/0231779 A1 | 9/2013 | Purkayastha et al. |
| 2013/0308822 A1 | 11/2013 | Marimon et al. |
| 2013/0338856 A1 | 12/2013 | Yelland et al. |
| 2014/0032013 A1 | 1/2014 | Riley |
| 2014/0032034 A1 | 1/2014 | Raptopoulos et al. |
| 2014/0056438 A1 | 2/2014 | Baalu et al. |
| 2014/0163781 A1 | 6/2014 | Vian et al. |
| 2014/0222248 A1 | 8/2014 | Levien et al. |
| 2014/0249693 A1 | 9/2014 | Stark et al. |
| 2014/0277854 A1 | 9/2014 | Jones et al. |
| 2014/0350839 A1 | 11/2014 | Pack et al. |
| 2015/0128823 A1 | 5/2015 | Akcasu et al. |
| 2015/0148988 A1 | 5/2015 | Fleck |
| 2015/0212391 A1 | 7/2015 | Waibel et al. |
| 2015/0269438 A1 | 9/2015 | Samarasekera et al. |
| 2015/0350614 A1 | 12/2015 | Meier et al. |
| 2015/0379874 A1 | 12/2015 | Ubhi et al. |
| 2016/0068267 A1 | 3/2016 | Liu et al. |
| 2016/0070264 A1 | 3/2016 | Hu et al. |
| 2016/0070265 A1 | 3/2016 | Liu et al. |
| 2016/0216710 A1 | 7/2016 | Hu et al. |
| 2016/0217698 A1 | 7/2016 | Liu et al. |
| 2016/0225264 A1 | 8/2016 | Taveira |
| 2016/0273921 A1* | 9/2016 | Zhou ............... G01S 19/49 |
| 2016/0273922 A1 | 9/2016 | Stefan |
| 2017/0045886 A1 | 2/2017 | Liu et al. |

FOREIGN PATENT DOCUMENTS

| | | |
|---|---|---|
| CN | 101445156 A | 6/2009 |
| CN | 201331348 Y | 10/2009 |
| CN | 201331349 Y | 10/2009 |
| CN | 101650891 A | 2/2010 |
| CN | 101667036 A | 3/2010 |
| CN | 101762805 A | 6/2010 |
| CN | 101802738 A | 8/2010 |
| CN | 101867868 A | 10/2010 |
| CN | 101950027 A | 1/2011 |
| CN | 101952737 A | 1/2011 |
| CN | 102023003 A | 4/2011 |
| CN | 102362141 A | 2/2012 |
| CN | 102393747 A | 3/2012 |
| CN | 102460074 A | 5/2012 |
| CN | 102621987 A | 8/2012 |
| CN | 102707724 A | 10/2012 |
| CN | 102749927 A | 10/2012 |
| CN | 102854887 A | 1/2013 |
| CN | 202815124 U | 3/2013 |
| CN | 103256931 A | 8/2013 |
| CN | 103323002 A | 9/2013 |
| CN | 103365299 A | 10/2013 |
| CN | 203397214 U | 1/2014 |
| CN | 203397215 U | 1/2014 |
| CN | 103576690 A | 2/2014 |
| CN | 103744430 A | 4/2014 |
| CN | 103914077 A | 7/2014 |
| CN | 103925920 A | 7/2014 |
| CN | 103941748 A | 7/2014 |
| CN | 103941750 A | 7/2014 |
| CN | 103970143 A | 8/2014 |
| CN | 103984357 A | 8/2014 |
| CN | 104115082 A | 10/2014 |
| EP | 0588360 A1 | 3/1994 |
| EP | 2177966 A2 | 4/2010 |
| EP | 2515147 A2 | 10/2012 |
| EP | 2592436 A2 | 5/2013 |
| JP | H02241421 A | 9/1990 |
| JP | H08241123 A | 9/1996 |
| JP | H08273100 A | 10/1996 |
| JP | H08273110 A | 10/1996 |
| JP | H11282530 A | 10/1999 |
| JP | 2003127994 A | 5/2003 |
| JP | 2008304260 A | 12/2008 |
| JP | 2009041932 A | 2/2009 |
| JP | 2010095246 A | 4/2010 |
| JP | 2010095247 A | 4/2010 |
| JP | 2010095264 A | 4/2010 |
| JP | 2012140101 A | 7/2012 |
| JP | 2014002603 A | 1/2014 |
| JP | 2014002604 A | 1/2014 |
| JP | 2014041601 A | 3/2014 |
| WO | 2003004352 A1 | 1/2003 |
| WO | WO-2009091431 A1 | 7/2009 |
| WO | WO-2009118043 A1 | 10/2009 |
| WO | WO-2011120141 A1 | 10/2011 |
| WO | WO-2013163746 A1 | 11/2013 |
| WO | WO-2014108026 A1 | 7/2014 |

OTHER PUBLICATIONS

Office action dated Jun. 21, 2017 for U.S. Appl. No. 15/340,404.
Notice of allowance dated Jan. 6, 2017 for U.S. Appl. No. 14/801,599.
Notice of allowance dated Jan. 20, 2017 for U.S. Appl. No. 15/088,551.
Notice of allowance dated Jan. 26, 2017 for U.S. Appl. No. 15/088,551.
Notice of allowance dated Feb. 10, 2017 for U.S. Appl. No. 14/801,640.
Notice of allowance dated Feb. 10, 2017 for U.S. Appl. No. 15/088,645.
Bills, et al. Autonomous MAV flight in indoor environments using single image perspective cues. 2011 IEEE International Conference on Robotics and Automation (ICRA). May 9-13, 2011; 5776-5783. DOI:10.1109/ICRA.2011.5980136.
Co-pending U.S. Appl. No. 15/340,404, filed Nov. 1, 2016.
Corke, et al. An Introduction to Inertial and Visual Sensing. The International Journal of Robotics Research 2007 26: 519-535. DOI: 10.1177/0278364907079279.
European search report—partial dated Feb. 22, 2016 for EP Application No. 13828970.
European search report and opinion dated Jul. 6, 2016 for EP Application No. 14889182.
Extended European search report and opinion dated Aug. 3, 2016 for EP Application No. 13828970.
International search report and written opinion dated May 26, 2015 for PCT/CN2014/086005.
International search report and written opinion dated May 29, 2015 for PCT/CN2014/086006.
International search report and written opinion dated Jun. 10, 2015 for PCT/CN2014/086007.
International search report and written opinion dated Sep. 15, 2014 for PCT/CN2013/088971.
Masone, et al. Semi-autonomous Trajectory Generation for Mobile Robots with Integral Haptic Shared Control, In Proc. 2014 IEEE Intl Conference on Robotics and Automation, pp. 6468-6475, Jun. 7, 2014.
Merchant. Image information needed for autonomous systems, Proc. SPIE 5807, Automatic Target Recognition XV, 261 (May 23, 2005); doi:10.1117/12.605794.

(56) References Cited

OTHER PUBLICATIONS

Notice of allowance dated Mar. 22, 2016 for U.S. Appl. No. 14/801,599.
Notice of allowance dated Mar. 28, 2016 for U.S. Appl. No. 14/801,640.
Notice of allowance dated May 24, 2016 for U.S. Appl. No. 14/801,640.
Notice of allowance dated Jun. 27, 2016 for U.S. Appl. No. 14/801,599.
Notice of allowance dated Jul. 13, 2016 for U.S. Appl. No. 14/801,640.
Notice of allowance dated Aug. 9, 2016 for U.S. Appl. No. 15/088,551.
Notice of allowance dated Oct. 3, 2016 for U.S. Appl. No. 15/088,645.
Notice of allowance dated Dec. 1, 2016 for U.S. Appl. No. 14/801,599.
Notice of allowance dated Dec. 2, 2016 for U.S. Appl. No. 14/801,640.
Notice of allowance dated Dec. 9, 2016 for U.S. Appl. No. 15/088,645.
Office action dated May 12, 2016 for U.S. Appl. No. 14/814,159.
Office action dated May 16, 2016 for U.S. Appl. No. 14/845,894.
Office action dated May 16, 2016 for U.S. Appl. No. 15/088,551.
Office action dated Jun. 8, 2016 for U.S. Appl. No. 15/088,645.
Office action dated Oct. 22, 2015 for U.S. Appl. No. 14/814,159.
Office action dated Oct. 28, 2015 for U.S. Appl. No. 14/801,640.
Office action dated Nov. 17, 2015 for U.S. Appl. No. 14/801,599.
Office action dated Dec. 21, 2016 for U.S. Appl. No. 14/236,315.
Ross, et al. Multi-Sensor 3D image Fusion and interactive search. Information Fusion, 2000. Fusion 2000. Proceedings of the Third International Conference on. vol. 1. IEEE, 2000.
Sanfourche, et al. Perception for UAV: Vision-based navigation and environment modeling. Journal Aerospace Lab 4 (2012): 1-19.
Serranoa, et al. Seamless indoor-outdoor navigation for unmanned multi-sensor aerial platforms. The International Archives of Photogrammetry, Remote Sensing and Spatial Information SciencesMar. 5, 2014; XL-3/W1:115-122.
Soloviev, et al. Tight coupling of GPS, laser scanner, and inertial measurements for navigation in urban environments. 2008 IEEE/ION Position, Location and Navigation Symposium. IEEE, 2008. 511-525.
Thrun, et al. Integrating grid-based and topological maps for mobile robot navigation. In Proceedings of the National Conference on Artificial Intelligence. Portland, Oregon. Aug. 1996; (pp. 944-951).
U.S. Appl. No. 14/801,599, filed Jul. 16, 2015.
U.S. Appl. No. 14/801,640, filed Jul. 16, 2015.
U.S. Appl. No. 14/814,159, filed Jul. 30, 2015.
Fengchun Zhu, Research on Navigation and Environment Modeling of Mobile Robot, Dissertation of Doctor of Philosophy, College of Information and Electrical Engineering, Shandong University of Science and Technology, May 2007, 150 Pages.
The United States Patent and Trademark Office (USPTO) Notice of Allowance for U.S. Appl. No. 14/814,159, dated May 4, 2017.
Parra, et al. Visual odometry and map fusion for GPS navigation assistance. In Industrial Electronics (ISIE), Jun. 2011 IEEE International Symposium on (pp. 832-837). IEEE.
Krajnik et al., AR-Drone as a Platform for Robotic Research and Education, Research and Education in Robotics-Eurobot 2011 (2011): 172-186.
The United States Patent and Trademark Office (USPTO), Notice of Allowance for U.S. Appl. No. 14/814,159, dated Apr. 12, 2017.
The European Patent Office (EPO), EP Search Report and Search Opinion 14901421.9, dated Mar. 20, 2017.
The United States Patent and Trademark Office (USPTO), Notice of Allowance for U.S. Appl. No. 14/801,599, dated Dec. 1, 2016.
The United States Patent and Trademark Office (USPTO), Notice of Allowance for U.S. Appl. No. 14/801,640, dated Dec. 2, 2016.
The United States Patent and Trademark Office (USPTO), Notice of Allowance for U.S. Appl. No. 15/088,645, dated Dec. 9, 2016.
The World Intellectual Property Organization (WIPO), International Search Report and Written Opinion PCT/CN2014/086006, dated May 29, 2015.
The World Intellectual Property Organization (WIPO), International Search Report and Written Opinion PCT/CN2014/086007, dated Jun. 10, 2016.
Evan Dill et al., Seamless Indoor-Outdoor Navigation for Unmanned Multi-Sensor Aerial Platforms, In Position, Location and Navigation Symposium-PLANS 2014, 2014, IEE/ION, pp. 1174-1182.
The United States Patent and Trademark Office (USPTO), Office Action for U.S. Appl. No. 14/236,315, dated Jul. 27, 2017.

\* cited by examiner

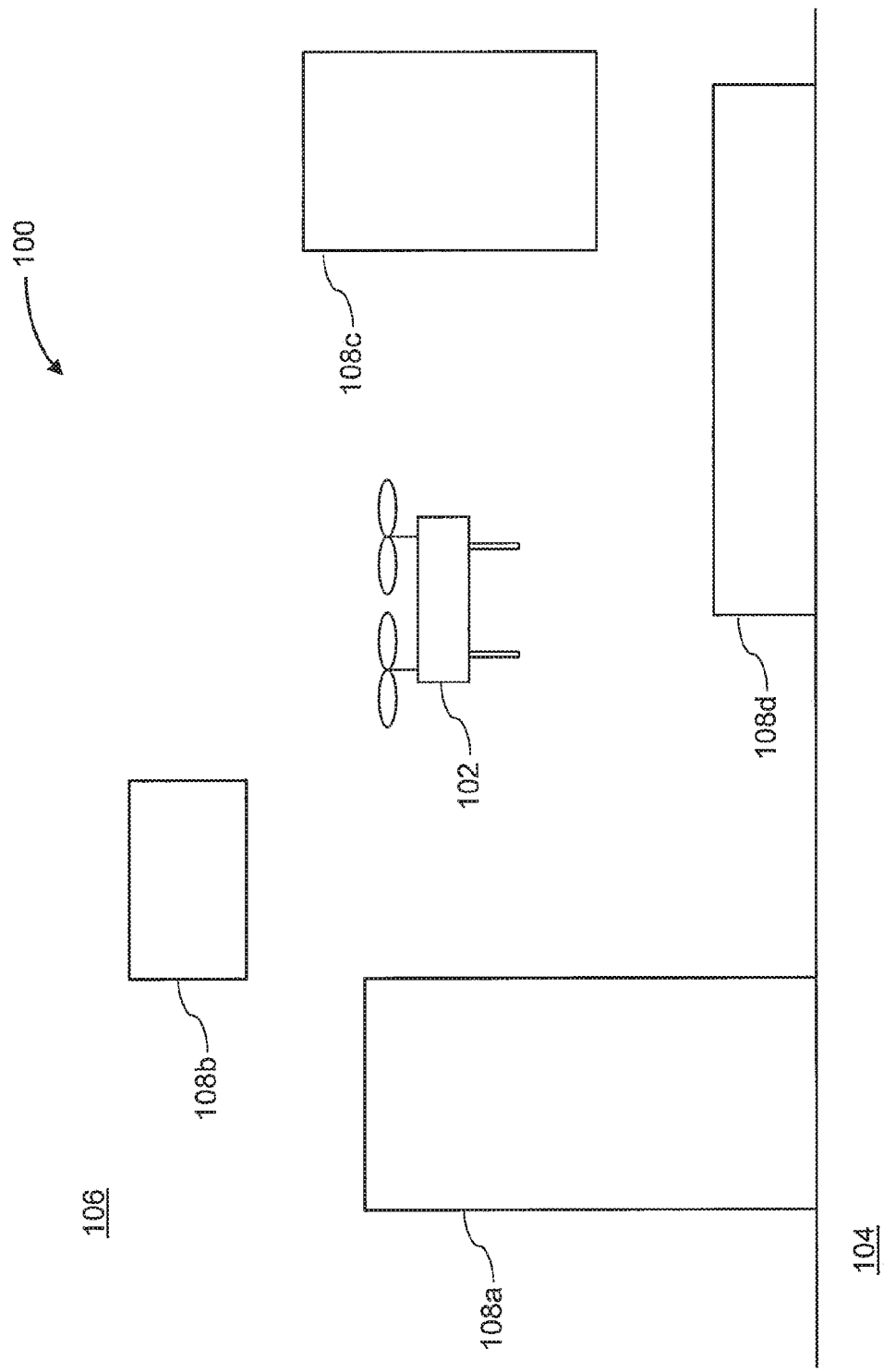

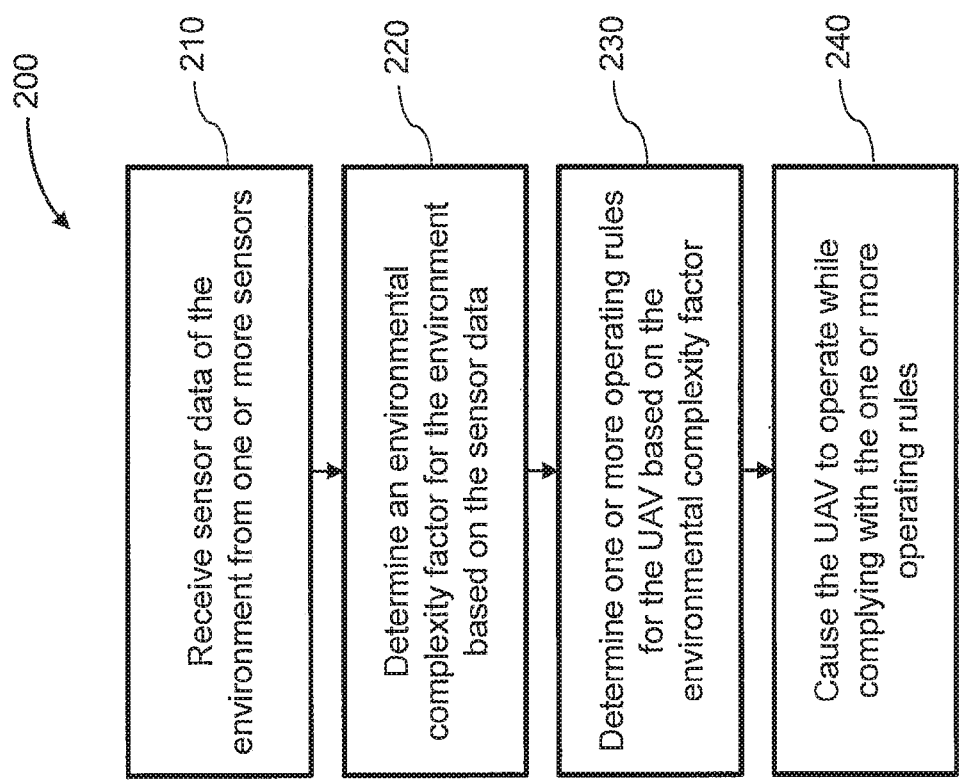

VELOCITY CONTROL FOR AN UNMANNED AERIAL VEHICLE

CROSS-REFERENCE

This application is a continuation of U.S. patent application Ser. No. 15/088,551, filed Apr. 1, 2016 now U.S. Pat. No. 9,625,909, which is a continuation of U.S. patent application Ser. No. 14/801,599, filed Jul. 16, 2015 now U.S. Pat. No. 9,625,907, which is a continuation of International Application No. PCT/CN2014/086005, filed Sep. 5, 2014, the contents of which are hereby incorporated by reference in their entireties.

BACKGROUND

Unmanned vehicles such as unmanned aerial vehicles can be used for performing surveillance, reconnaissance, and exploration tasks in a wide variety of environments for military and civilian applications. An unmanned aerial vehicle may be manually controlled by a remote user, or may operate in a semi-autonomous or fully autonomous manner. Various control schemes can be implemented to enable operation of an unmanned aerial vehicle within an environment with varying degrees of autonomy.

However, existing control schemes for unmanned aerial vehicles may not be optimal in some instances. For example, an unmanned aerial vehicle may operate in environments in which obstacles are present (e.g., buildings, trees, human beings, other aerial objects). Existing control schemes may rely upon the user's own judgment to determine safe operating parameters for the unmanned aerial vehicle in order to minimize the probability of collisions with obstacles. This may be challenging for inexperienced users or in situations where the user cannot easily see the environment surrounding the unmanned aerial vehicle (e.g., when the unmanned aerial vehicle is relatively far from the user).

SUMMARY

Improved control schemes for improving the safety of unmanned aerial vehicles are needed. The present disclosure provides systems and methods for automatically determining operating rules for an unmanned aerial vehicle. The operating rules can pertain to any suitable aspect of UAV operation, such as velocity, acceleration, position, or orientation. In some embodiments, the operating rules are automatically determined during flight using data obtained from various sensors. The sensor data can be analyzed to determine the obstacle density of the environment in order to select appropriate operating rules for controlling the unmanned aerial vehicle, thereby reducing the likelihood of collisions with obstacles.

Thus, in one aspect, a system for controlling an unmanned aerial vehicle within an environment is provided. The system comprises one or more sensors carried on the unmanned aerial vehicle and configured to receive sensor data of the environment and one or more processors. The one or more processors may be individually or collectively configured to: determine, based on the sensor data, an environmental complexity factor representative of an obstacle density for the environment; determine, based on the environmental complexity factor, one or more operating rules for the unmanned aerial vehicle; receive a signal indicating a desired movement of the unmanned aerial vehicle; and cause the unmanned aerial vehicle to move in accordance with the signal while complying with the one or more operating rules.

In some embodiments, the one or more sensors comprise a vision sensor, such as a stereovision sensor. The one or more sensors can comprise a lidar sensor or an ultrasonic sensor. The one or more sensors can comprise a plurality of different sensor types. The sensor data obtained by the one or more sensors may be indicative of an obstacle density for the environment.

In some embodiments, the one or more processors are carried by the unmanned aerial vehicle. The environmental complexity factor can be determined based on a three-dimensional digital representation of the environment generated using the sensor data. The three-dimensional digital representation can comprise a three-dimensional point cloud or an occupancy grid.

The operating rules can be determined in any suitable manner. For instance, the one or more operating rules can be configured to prevent collisions between the unmanned aerial vehicle and obstacles in the environment. The one or more operating rules can be determined based on previously obtained flight data. In some embodiments, the one or more operating rules comprise one or more velocity rules. The one or more velocity rules can be determined using a first-in-first-out (FIFO) queue of previously determined velocity rules. The one or more velocity rules can be determined based on a minimum braking distance for the unmanned aerial vehicle. In some embodiments, the one or more velocity rules comprise a velocity limit for the unmanned aerial vehicle.

In some embodiments, the signal comprises a user input command.

In some embodiments, the one or more operating rules comprise one or more attitude rules. Alternatively or in combination, the one or more operating rules can comprise one or more altitude rules.

In another aspect, a method for controlling an unmanned aerial vehicle within an environment is provided. The method comprises: receiving sensor data of the environment from one or more sensors carried on the unmanned aerial vehicle; determining, based on the sensor data and with aid of a processor, an environmental complexity factor representative of an obstacle density for the environment; determining, based on the environmental complexity factor and with aid of the processor, one or more operating rules for the unmanned aerial vehicle; receiving a signal indicating a desired movement of the unmanned aerial vehicle; and causing the unmanned aerial vehicle to move in accordance with the signal while complying with the one or more operating rules.

In another aspect, a system for controlling an unmanned aerial vehicle within an environment is provided. The system comprises one or more sensors carried on the unmanned aerial vehicle and configured to receive sensor data of the environment and one or more processors. The one or more processors may be individually or collectively configured to: determine, based on the sensor data, a first set of operating rules for the unmanned aerial vehicle; receive user input indicating a second set of operating rules for the unmanned aerial vehicle; select one of the first or second sets of operating rules to be used to control the unmanned aerial vehicle; receive a signal indicating a desired movement of the unmanned aerial vehicle; and cause the unmanned aerial vehicle to move in accordance with the signal while complying with the selected one of the first or second sets of operating rules.

In some embodiments, the one or more sensors comprise a vision sensor, such as a stereovision sensor. The one or more sensors can comprise a lidar sensor or an ultrasonic sensor. The one or more sensors can comprise a plurality of different sensor types. The sensor data obtained by the one or more sensors may be indicative of an obstacle density for the environment. The one or more processors can be carried by the unmanned aerial vehicle.

In some embodiments, the user input can be received from a remote terminal.

The operating rules can be configured as desired. For instance, the first set of operating rules can be configured to prevent collisions between the unmanned aerial vehicle and obstacles in the environment. In some embodiments, the first set of operating rules comprises a first set of velocity rules and the second set of operating rules comprises a second set of velocity rules. The first set of velocity rules can be determined based on a minimum braking distance for the unmanned aerial vehicle. The second set of velocity rules can be determined based on a flight mode selected by the user from a plurality of different flight modes. The plurality of different flight modes can comprise a low velocity flight mode, an intermediate velocity flight mode, and a high velocity flight mode. In some embodiments, the first set of velocity rules comprises a first velocity limit for the unmanned aerial vehicle and the second set of velocity rules comprises a second velocity limit for the unmanned aerial vehicle. The one or more processors may select one of the first or second set of velocity rules by selecting the smaller of the first and second velocity limits.

In some embodiments, the signal comprises a user input command.

In some embodiments, the first and second sets of operating rules each comprise a set of attitude rules. Alternatively or in combination, the first and second sets of operating rules can each comprise a set of altitude rules.

In another aspect, a method for controlling an unmanned aerial vehicle within an environment is provided. The method comprises: receiving sensor data of the environment from one or more sensors carried on the unmanned aerial vehicle; determining, based on the sensor data and with aid of a processor, a first set of operating rules for the unmanned aerial vehicle; receiving user input indicating a second set of operating rules for the unmanned aerial vehicle; selecting one of the first or second sets of operating rules to be used to control the unmanned aerial vehicle; receiving a signal indicating a desired movement of the unmanned aerial vehicle; and causing the unmanned aerial vehicle to move in accordance with the signal while complying with the selected one of the first or second sets of operating rules.

In another aspect, a system for controlling an unmanned aerial vehicle within an environment is provided. The system comprises one or more sensors carried on the unmanned aerial vehicle; and one or more processors. The one or more processors may be individually or collectively configured to: determine, using the one or more sensors, an environmental complexity factor representative of an obstacle density for the environment; determine, based on the environmental complexity factor and with aid of the processor, a first set of operating rules for the unmanned aerial vehicle; detect, using the one or more sensors, a change in the environmental complexity factor corresponding to a change in the obstacle density for the environment; and modify the first set of operating rules based on the change in the environmental complexity factor to provide a second set of operating rules for the unmanned aerial vehicle.

In some embodiments, the one or more sensors comprise a vision sensor, such as a stereovision sensor. The one or more sensors can comprise a lidar sensor or an ultrasonic sensor. The one or more sensors can comprise a plurality of different sensor types. The sensor data obtained by the one or more sensors may be indicative of an obstacle density for the environment.

In some embodiments, the one or more processors are carried by the unmanned aerial vehicle. The environmental complexity factor can be determined based on a three-dimensional digital representation of the environment generated using the sensor data. The three-dimensional digital representation can comprise a three-dimensional point cloud or an occupancy grid.

In some embodiments, at least one of the first and second sets of operating rules can be configured to prevent collisions between the unmanned aerial vehicle and obstacles in the environment. The first set of operating rules can comprise a first set of velocity rules and the second set of operating rules can comprise a second set of velocity rules. At least one of the first and second sets of velocity rules can be determined based on a minimum braking distance for the unmanned aerial vehicle. Optionally, the first and second sets of velocity rules may each comprise a first velocity limit for the unmanned aerial vehicle. In some embodiments, the change in the environmental complexity factor corresponds to a decrease in the obstacle density, and the velocity limit of the second set of velocity rules is greater than the velocity limit of the first set of velocity rules.

In some embodiments, the first and second sets of operating rules each comprise a set of attitude rules. Alternatively or in combination, the first and second sets of operating rules can each comprise a set of altitude rules.

In another aspect, a method for controlling an unmanned aerial vehicle within an environment is provided. The method comprises: determining, using one or more sensors carried by the unmanned aerial vehicle and with aid of a processor, an environmental complexity factor representative of an obstacle density for the environment; determining, based on the environmental complexity factor and with aid of the processor, a first set of operating rules for the unmanned aerial vehicle; detecting, using the one or more sensors, a change in the environmental complexity factor corresponding to a change in the obstacle density for the environment; and modifying the first set of operating rules based on the change in the environmental complexity factor to provide a second set of operating rules for the unmanned aerial vehicle.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A illustrates an unmanned aerial vehicle operating in an outdoor environment, in accordance with embodiments;

FIG. 2 illustrates a method for determining operating rules for controlling an unmanned aerial vehicle, in accordance with embodiments;

DETAILED DESCRIPTION

Figure 1B:
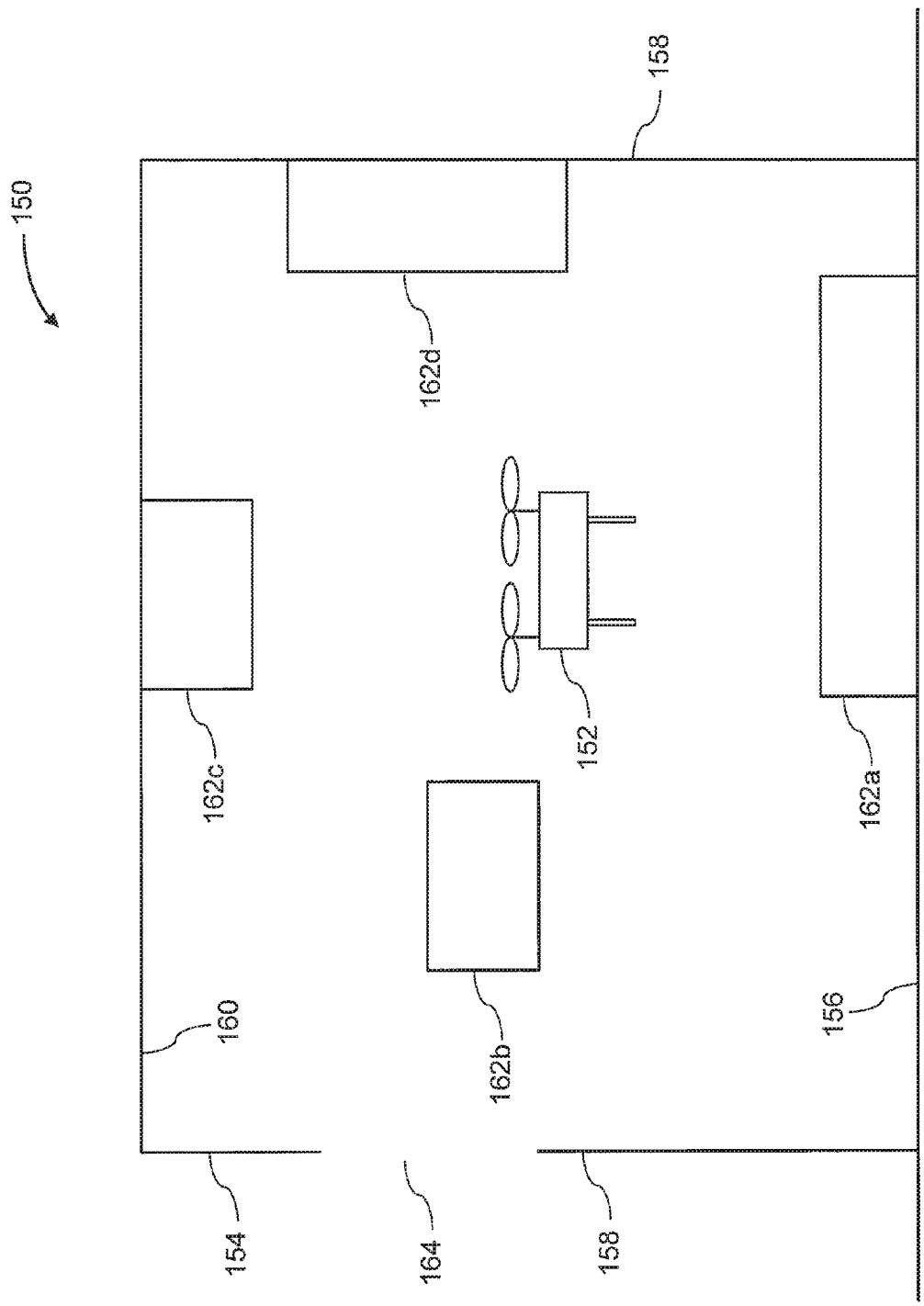
FIG. 1B illustrates an unmanned aerial vehicle operating in an indoor environment, in accordance with embodiments.

The present disclosure provides improved systems and methods for determining operating rules for operating an unmanned aerial vehicle (UAV). The UAV can carry one or more sensors used to obtain data of the surrounding environment, and this data can subsequently be processed to detect the degree to which obstacles and other potential safety hazards are present in the surrounding environment, which may be referred to herein as an "environmental complexity factor." The environmental complexity factor can be used to determine a set of operating rules (e.g., velocity rules such as velocity limits or velocity ranges) to be observed while operating the UAV within the environment. For example, the maximum velocity limit for the UAV may be relatively low when the UAV is operating within a "complex" environment (an environment with a high obstacle density, such as an indoor, urban, or low altitude environment), thereby reducing the risk of accidental collisions. Conversely, the maximum velocity limit for the UAV may be relatively high when operating within a less complex environment in which collisions are unlikely to occur (an environment having a low obstacle density, such as a high altitude environment). Advantageously, the embodiments described herein can be used to automatically and dynamically optimize the operating parameters for the UAV based on the current environmental context, thereby enhancing the safety, ease of use, and adaptability of the UAV.

The UAVs described herein can be operated autonomously (e.g., by a suitable computing system such as an onboard controller), semi-autonomously, or manually (e.g., by a human user). The UAV can receive commands from a suitable entity (e.g., human user or autonomous controller) and respond to such commands by performing one or more actions. For example, the UAV can be controlled to take off from the ground, move within the air (e.g., with up to three degrees of freedom in translation and up to three degrees of freedom in rotation), hover within the air, land on the ground, and so on. As another example, the UAV can be controlled to move at a specified velocity and/or acceleration (e.g., with up to three degrees of freedom in translation and up to three degrees of freedom in rotation). The UAV may have a maximum horizontal velocity of approximately 13 m/s, or within a range from 10 m/s to 15 m/s. The UAV may have a maximum vertical velocity of approximately 6 m/s, or within a range from 5 m/s to 10 m/s. The UAV may have a maximum translational acceleration of approximately 6.8 $m/s^2$, or within a range from 5 $m/s^2$ to 10 $m/s^2$. In some embodiments, translational acceleration of the UAV may cause the UAV to assume a corresponding attitude. Accordingly, the maximum translational acceleration of the UAV may be constrained by the maximum attitude. In some embodiments, the maximum attitude angle for the UAV (relative to the vertical axis of the UAV) may be approximately 35°, or within a range from 25° to 45°. Attitude may be used herein to refer to the roll and/or pitch angle of the UAV.

Turning now the drawings, FIG. 1A illustrates a UAV 102 operating in an outdoor environment 100, in accordance with embodiments. The outdoor environment 100 may be an urban, suburban, or rural setting, or any other environment that is not at least partially within a building. The UAV 102 may be operated relatively close to the ground 104 (e.g., low altitude) or relatively far from the ground 104 (e.g., high altitude). For example, a UAV 102 operating less than or equal to approximately 10 m from the ground may be considered to be at low altitude, while a UAV 102 operating at greater than or equal approximately 10 m from the ground may be considered to be at high altitude.

In some embodiments, the outdoor environment 100 includes one or more obstacles 108a-d. An obstacle may include any object or entity that may obstruct the movement of the UAV 102. Some obstacles may be situated on the ground 104 (e.g., obstacles 108a, 108d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 104, water, manmade structures, or natural structures. Alternatively, some obstacles may be wholly located in the air 106 (e.g., obstacles 108b, 108c), including aerial vehicles (e.g., airplanes, helicopters, hot air balloons, other UAVs) or birds. Aerial obstacles may not be supported by the ground 104, or by water, or by any natural or manmade structures. An obstacle located on the ground 104 may include portions that extend substantially into the air 106 (e.g., tall structures such as towers, skyscrapers, lamp posts, radio towers, power lines, trees, etc.).

FIG. 1B illustrates a UAV 152 operating in an indoor environment 150, in accordance with embodiments. The indoor environment 150 is within the interior of a building 154 having a floor 156, one or more walls 158, and/or a ceiling or roof 160. Exemplary buildings include residential, commercial, or industrial buildings such as houses, apartments, offices, manufacturing facilities, storage facilities, and so on. The interior of the building 154 may be completely enclosed by the floor 156, walls 158, and ceiling 160 such that the UAV 152 is constrained to the interior space. Conversely, at least one of the floor 156, walls 158, or ceiling 160 may be absent, thereby enabling the UAV 152 to fly from inside to outside, or vice-versa. Alternatively or in combination, one or more apertures 164 may be formed in the floor 156, walls 158, or ceiling 160 (e.g., a door, window, skylight).

Similar to the outdoor environment 100, the indoor environment 150 can include one or more obstacles 162a-d. Some obstacles may be situated on the floor 156 (e.g., obstacle 162a), such as furniture, appliances, human beings, animals, plants, and other manmade or natural objects. Conversely, some obstacles may be located in the air (e.g., obstacle 162b), such as birds or other UAVs. Some obstacles in the indoor environment 150 can be supported by other structures or objects. Obstacles may also be attached to the ceiling 160 (e.g., obstacle 162c), such as light fixtures, ceiling fans, beams, or other ceiling-mounted appliances or structures. In some embodiments, obstacles may be attached to the walls 158 (e.g., obstacle 162d), such as light fixtures, shelves, cabinets, and other wall-mounted appliances or structures. Notably, the structural components of the building 154 can also be considered to be obstacles, including the floor 156, walls 158, and ceiling 160.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

The safety risk associated with operating a UAV within a particular environment may be related to the amount and types of obstacles within the environment. Different types of environments may be associated with different amounts and types of obstacles. For example, a high altitude environment may have few or no obstacles. In contrast, an indoor environment or a low altitude environment may have more obstacles. Some types of low altitude, outdoor environments (e.g., fields and other flat, open spaces) may have fewer obstacles than other types (e.g., urban settings and other highly populated areas, forests). Accordingly, a UAV operating within an environment with a high obstacle density may be exposed to an increased risk of collisions, near-misses, or other safety incidents. Conversely, UAV operation within a low obstacle density environment may be relatively safe. Mobile obstacles may pose an increased risk compared to stationary obstacles, as mobile obstacles may collide with or obstruct the UAV independently of any action taken by the UAV.

A UAV can be operated within various environments in accordance with one or more operating rules. In some embodiments, the one or more operating rules may provide ranges, limits, values, and the like for one or more aspects of the state of the UAV (e.g., altitude, latitude, longitude, roll, pitch, yaw, translational velocity, angular velocity, translational acceleration, angular acceleration, etc.). As another example, one or more operating rules may provide algorithms, logic, processes, and the like for implementing one or more UAV functionalities (e.g., collision avoidance, fault detection, safety mechanisms, navigation, mapping, data collection, data processing, etc.). Alternatively or in combination, exemplary operating rules may provide algorithms, logic, processes, and the like for controlling one or more aspects of UAV behavior (e.g., response to user commands, response to detected obstacles, response to errors or malfunctions, autonomous or semi-autonomous operation, etc.).

For example, in some embodiments, the operating rules can include one or more velocity rules for the UAV. Exemplary velocity rules that may be applied to control the operation of a UAV may include a velocity limit (e.g., a maximum or minimum velocity value), a velocity range, a velocity value, or suitable combinations thereof. The velocity rules for a UAV may be related to the maximum velocity of the UAV. For instance, the velocity limit or velocity value can be approximately 10%, 20%, 30%, 40%, 50%, 60%, 70%, 80%, 90% or 100% of the maximum velocity. The velocity range can be between any two of the following values: 10%, 20%, 30%, 40%, 50%, 60%, 70%, 80%, 90% or 100% of the maximum velocity. The velocity rules may apply to all directions of motion (e.g., up/down, left/right, forwards/backwards, roll, pitch, yaw). Alternatively, the velocity rules may apply only to movement along certain directions. Furthermore, the velocity rules may be the same for all directions, or may differ for some directions. For example, the velocity rules for translational movements may be different than the velocity rules for rotational movements.

Alternatively or in combination, other types of operating rules can also be used, such as rules providing ranges, limits, and/or values for UAV attitude, altitude, acceleration, and the like. Any description herein pertaining to velocity rules can also be applied to other types of operating rules, and vice-versa.

Optionally, a set of operating rules may be associated with a flight mode for the UAV. The term "flight mode" may be used herein to refer to a control scheme for operating a UAV. Various types of flight modes can be used to control a UAV, and each flight mode can include a different set of operating rules. In some embodiments, a flight mode may be defined based on the extent of user control provided by the flight mode (e.g., "free" or "manual", "fully autonomous," or "semi-autonomous" flight modes), the intended environment type for using the flight mode (e.g., "low altitude," "high altitude," "indoor," "outdoor," "long range," or "short range," flight modes), the operating rules of the flight mode (e.g., "low velocity," "intermediate velocity," or "high velocity"flight modes), or suitable combinations thereof. Any description herein pertaining to determination of one or more operating rules can also be applied to determination of a flight mode associated with the one or more operating rules, and vice-versa. Any suitable number and combination of flight modes can be used, such as one, two, three, four, five, or more different flight modes, each corresponding to a respective set of operating rules. The appropriate operating rules for each flight mode may be determined in any suitable manner, e.g., based on analysis of previous flight data, machine learning, feedback from test users, etc.

The operating rules described herein can be used to improve various aspects of UAV operation. For example, at least some of the operating rules can be configured to reduce the safety risk associated with using a UAV. The optimal operating rules for the UAV may vary based on the current environmental conditions, such as the amount and types of obstacles present within the environment. Accordingly, suitable methods may be implemented to assess the environment surrounding the UAV so as to determine an appropriate set of operating rules.

FIG. 2 illustrates a method 200 for determining operating rules for controlling a UAV within an environment, in accordance with embodiments. The method 200, as with all methods presented herein, can be practiced using any embodiment of the systems and devices described herein. For example, one or more steps of the method 200 can be performed by one or more processors, acting individually or collectively. Some of the processors may be carried by the UAV (e.g., on-board processors). Alternatively or in combination, some of the processors may be in communication with the UAV from a remote location (e.g., a remote computing system or device). In some embodiments, a remote device can be a remote controller that accepts one or more user inputs to control one or more components of another device (e.g., the UAV or portions thereof, a display unit, or other external devices), as described in further detail herein. The method 200 can be performed in a fully automated manner without requiring any user input or manual intervention. In some embodiments, the steps of the method 200 are performed in real-time during operation of the UAV, thereby providing real-time context-based adjustment of UAV operating rules.

In step 210, sensor data of the environment is received from one or more sensors. Any sensor suitable for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The sensor data may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the obstacles in the environment, such as the number of obstacles, the volume or percentage of space occupied by obstacles, the volume or percentage of space within a certain proximity to the UAV occupied by obstacles, the volume or percentage of space unobstructed by obstacles, the volume or percentage of space within a certain proximity to the UAV unobstructed by obstacles, the proximity of obstacles to the UAV, the obstacle density (e.g., number of obstacles per unit space), the types of obstacles (e.g., stationary or mobile), the spatial disposition of obstacles (e.g., position, orientation), the motion of obstacles (e.g., velocity, acceleration), and so on.

In some embodiments, at least some of the sensors may be configured to provide data regarding a state of the UAV. The state information provided by a sensor can include information regarding a spatial disposition of the UAV (e.g., position, orientation). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global reference frame or relative to the reference frame of another entity.

The sensors described herein can be carried by the UAV. A sensor can be situated on any suitable portion of the UAV, such as above, underneath, on the side(s) of, or within a vehicle body of the UAV. Some sensors can be mechanically coupled to the UAV such that the spatial disposition and/or motion of the UAV correspond to the spatial disposition and/or motion of the sensors. The sensor can be coupled to the UAV via a rigid coupling, such that the sensor does not move relative to the portion of the UAV to which it is attached. Alternatively, the coupling between the sensor and the UAV can permit movement of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein.

In step 220, an environmental complexity factor for the environment is determined based on the sensor data. In embodiments where a plurality of sensors are used to collect environmental information, the sensor data can be combined using suitable sensor fusion methods (e.g., Kalman filter, extended Kalman filter, unscented Kalman filter, or combinations thereof). The combined or fused sensor data can then be used to generate a representation of the environment surrounding the UAV, including any obstacles present in the environment. An environmental complexity factor can then be computed based on the generated environmental representation. As previously described herein, the environmental complexity factor can be used to represent the extent to which an environment is occupied by obstacles. The environmental complexity factor may be a quantitative or qualitative measure. In some embodiments, the environmental complexity factor is determined based on one or more of: the number of obstacles, the volume or percentage of space occupied by obstacles, the volume or percentage of space within a certain proximity to the UAV occupied by obstacles, the volume or percentage of space unobstructed by obstacles, the volume or percentage of space within a certain proximity to the UAV unobstructed by obstacles, the proximity of obstacles to the UAV, the obstacle density (e.g., number of obstacles per unit space), the types of obstacles (e.g., stationary or mobile), the spatial disposition of obstacles (e.g., position, orientation), the motion of obstacles (e.g., velocity, acceleration), and so on. For instance, an environment having a relatively high obstacle density would be associated with a high environmental complexity factor (e.g., indoor environment, urban environment), whereas an environment having a relatively low obstacle density would be associated with a low environmental complexity factor (e.g., high altitude environment). As another example, an environment in which a large percentage of space is occupied by obstacles would have a higher complexity, whereas an environment having a large percentage of unobstructed space would have a lower complexity. Exemplary methods for determining the environmental complexity factor of an environment are provided in greater detail below.

In step 230, one or more operating rules for the operation of the unmanned aerial vehicle are determined based on the environmental complexity factor. As previously described, at least some of the operating rules can be configured to reduce the probability of collisions with environmental obstacles. Accordingly, the operating rules for relatively complex environments may differ from the operating rules for less complex environments, on the basis of the differing obstacle densities associated with such environments.

For example, the operating rules can include velocity rules configured to minimize and/or prevent collisions between the UAV and obstacles within the environment. For instance, the velocity rules may provide constraints for the velocity of the UAV (e.g., with respect to up to three degrees of freedom in translation and up to three degrees of freedom in rotation) in order to ensure that the UAV is able to come to a stop (e.g., using automated anti-collision mechanisms or through user intervention) before colliding with an obstacle even when moving at the maximum allowable velocity. Accordingly, the UAV may be constrained to move at lower velocities when within complex environments compared to less complex environments. In some embodiments, when operating within a highly complex environment, the UAV may be constrained to move at a velocity of less than or equal to approximately 6 m/s, or within a range of 1 m/s to 6 m/s. Conversely, when operating within a less complex environment, the UAV may be constrained to move at a velocity of less than or equal to approximately 13 m/s, or within a range of 10 m/s to 15 m/s. Optionally, the velocity rules may differ depending on the current stage of operation of the UAV, including take off, landing, and during flight. For instance, when the UAV is initially taking off and there is relatively little sensor data available, the velocity rules may set a lowered velocity limit for the UAV, such as approximately 7 m/s, or within a range from 5 m/s to 10 m/s. In some instances, it may be desirable for the UAV to maintain a distance from environmental obstacles that is greater than or equal to the minimum braking distance. Accordingly, the velocity rules may be determined based on the minimum braking distance for the UAV. The minimum braking distance may vary with velocity according to the relation $$v^2 = 2as$$

where v represents the velocity, a represents the maximum acceleration (e.g., 6.8 m/s$^2$), and s represents the minimum braking distance to bring the UAV to a stop (hover in place). For instance, when the UAV is moving with a translational velocity of 7 m/s, the corresponding minimum braking distance may be approximately 3 m to 4 m and it may take approximately 2 s to 3 s for the UAV to come to a stop.

Optionally, the operating rules can also be determined based on one or more characteristics of the UAV or components thereof, such as the power output of the propulsion system, braking capabilities, sensor reliability and accuracy, dimensions (e.g., length, width, height, volume), weight, and so on. For instance, a larger, heavier UAV may present more of a safety hazard than a smaller, lighter UAV, and may therefore be subject to more stringent operating rules to prevent collisions, crash landings, and other accidents. Furthermore, the operating rules can also be determined based on considerations of the quality of the user experience in piloting the UAV. The operating rules may be configured to avoid placing unnecessary or excessive constraints on manual control of the UAV. For instance, it may be desirable to allow the user to operate the UAV at the maximum velocity limit and/or range that also fulfills the safety criteria described herein.

In some embodiments, the appropriate operating rules for a particular environment can be determined based on previously obtained flight data. The flight data can be collected during previous flights of the UAV or of other UAVs (e.g., of the same or similar model or type, or of different models or types) and can include information regarding UAV state (e.g., position, orientation, velocity, acceleration, attitude, altitude, sensor data, sensor noise, or suitable combinations thereof), as well as environmental information and/or obstacle information as previously described herein. The flight data can be analyzed using machine learning techniques in order to provide analysis results that inform the determination of the operating rules. For example, a machine learning algorithm or model can be trained on the previously obtained flight data in order to identify optimal operating rules for various types of environmental conditions and contexts. Alternatively or in combination, big data processing techniques can be used to analyze the collected flight data. The data analysis and/or machine learning can be performed prior to operation of the UAV using an appropriate computing system, and the results can be made accessible to the UAV processor(s) (e.g., stored onboard the UAV) for use in determining the operating rules.

In step 240, the UAV is caused to operate while complying with the one or more operating rules. The operating rules may apply when the UAV is being controlled manually, semi-autonomously, or fully autonomously. For instance, the UAV may receive a signal (e.g., an input command from a user, a control instruction from an automated control system) indicating a desired movement for the UAV (e.g., a desired translation, rotation, velocity, and/or acceleration). One or more onboard processors of the UAV (or any other suitable system or device provided herein) can determine whether the UAV can move as instructed by the received signal while complying with the operating rules. If so, the processors can generate control instructions that are transmitted to the UAV propulsion system in order to cause the UAV to execute the movement. If not, the processors can modify the signal so that the resultant movement is in compliance with the operating rules and provide the corresponding instructions to the propulsion system. For example, if a user instructs the UAV to move at a velocity exceeding a determined velocity limit, the processors can instead cause the UAV to move at a velocity less than or equal to the maximum velocity specified by the velocity limit. In such situations, the UAV may not exceed the maximum velocity regardless of the input provided by the user. Furthermore, one or more of the sensors previously described herein can be used to measure the current state (e.g., position, orientation, velocity, acceleration) of the UAV and provide feedback to the UAV control system to ensure that the operating rules are continuously obeyed.

Various techniques can be applied to reduce the noise of the sensor measurements so as to improve the stability of UAV control, such as filtering, sensor fusion (e.g., using Kalman filters), time-averaging, and so on.

Although the above steps show method 200 of controlling a UAV in accordance with embodiments, a person of ordinary skill in the art will recognize many variations based on the teachings described herein. Some of the steps may comprise sub-steps. In some embodiments, step 220 is optional, such that in step 230 the operating rules are determined based on the sensor data without considering the environmental complexity factor. Many of the steps may be repeated as often as is beneficial. For example, steps 210, 220, 230, and 240 can be repeated continuously or at predetermined time intervals during the operation of the UAV so as to provide dynamic and adaptive determination of the operating rules. Accordingly, the method 200 can be used to detect a change in the obstacle content (e.g., obstacle density) of the environment, as indicated by a change in the determined environmental complexity factor. The operating rules can subsequently be modified to reflect the change in the environmental complexity factor, thereby dynamically adapting the UAV control scheme based on the current environmental context. For instance, if a decrease in obstacle density is detected (as evidenced by a decrease in the environmental complexity factor), the velocity limit may be increased. Conversely, if an increase in obstacle density is detected (corresponding to an increased in environmental complexity), the velocity limit may be decreased.

Figure 3:
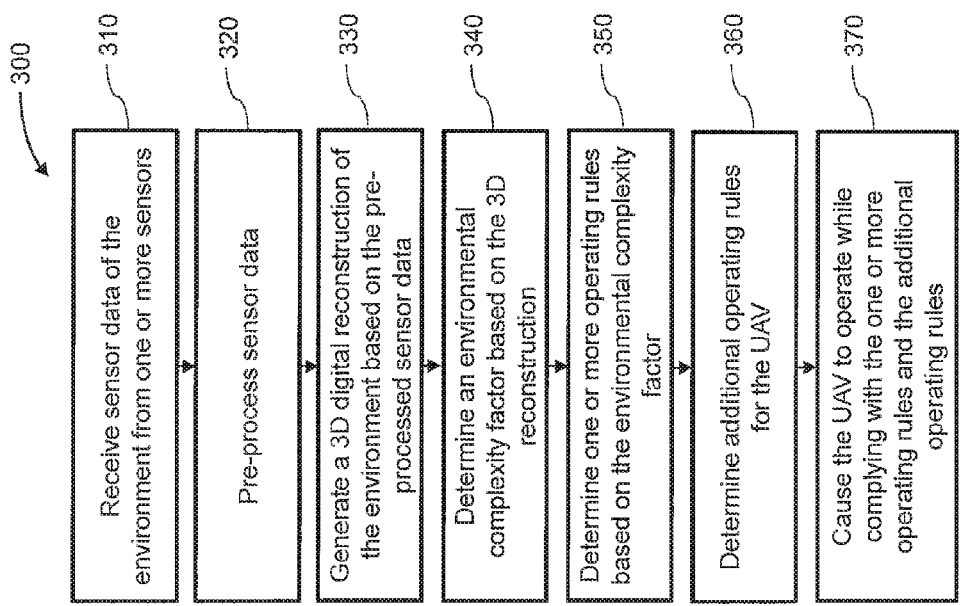
FIG. 3 illustrates a method for controlling an unmanned aerial vehicle, in accordance with embodiments.

FIG. 3 illustrates a method 300 for controlling a UAV, in accordance with embodiments. The steps of the method 300 can be combined with or substituted for any of the steps of the other methods provided herein. Additionally, any step of the method 300 can be repeated, omitted, or combined with other steps as desired. Similar to the method 200, one or more steps of the method 300 can be performed in real-time during operation of the UAV.

In step 310, sensor data of the environment is received from one or more sensors. Similar to step 210 of the method 200, the one or more sensors may be sensors of different types. For example, the UAV may carry one or more vision sensors (e.g., a stereovision sensor including a pair of cameras) and one or more proximity sensors (e.g., a lidar sensor, ultrasonic sensor, time-of-flight camera). The vision sensors and proximity sensors can be configured to capture data of the environment surrounding the UAV, such as data regarding the geometry, density, and spatial disposition of obstacles within the environment. In some embodiments, the sensors may span a 360° field of view around the UAV, and may provide information regarding obstacles situated within a 40 m radius from the UAV.

In step 320, the sensor data is pre-processed. The pre-processing may be performed to correct sensor errors, improve the signal-to-noise ratio and/or to enhance the quality and reliability of the sensor data. Any suitable data pre-processing technique can be used, such as filtering, time-averaging, and the like. For instance, for image data, image processing methods such as histogram equalization can be used to improve image data quality. Optionally, data from redundant sensors can be combined in order to reduce the effects of noise or errors from any one sensor.

In step 330, a three-dimensional (3D) digital reconstruction of the environment is generated based on the pre-processed sensor data. In embodiments where multiple sensors are used to capture environmental information, the 3D reconstruction can be produced by combining the data from each sensor using suitable sensor fusion methods (e.g., Kalman filters, extended Kalman filters, unscented Kalman filters, etc.). The sensor data may already be provided in a 3D format or otherwise include 3D environmental information. For example, proximity sensors such as lidar sensors or ultrasonic sensors may generate environmental data in the form of 3D point clouds. Alternatively, other types of sensor data may require additional processing in order to produce a 3D representation. For example, a stereovision sensor may include a pair of cameras, each being used to obtain a respective set of image data. The image data captured by each camera can be analyzed using appropriate computer vision algorithms in order to generate a 3D model representing the imaged environment. In some embodiments, the image data from both cameras can be compared in order to determine the disparity between each pair of images and thereby generate a disparity map that includes depth information for environmental obstacles.

Figure 4:
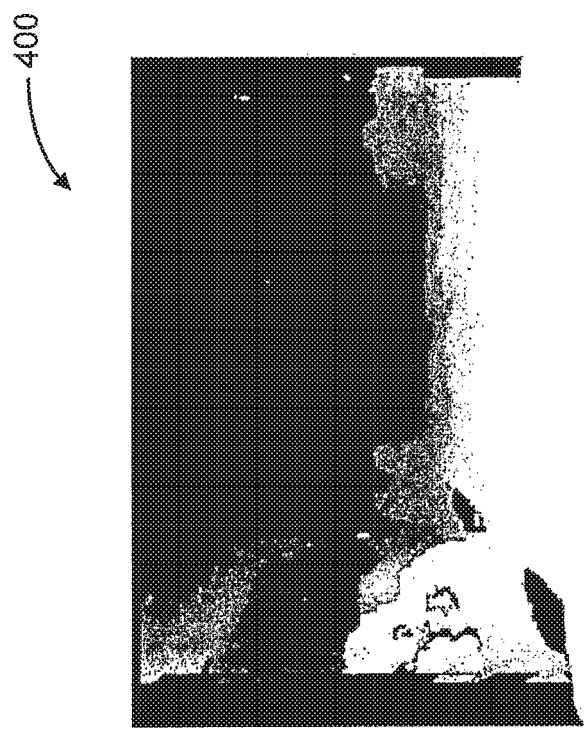
FIG. 4 illustrates a disparity map generated from sensor data of an environment, in accordance with embodiments.

FIG. 4 illustrates an exemplary disparity map 400 generated from sensor data of an environment, in accordance with embodiments. In the disparity map 400, light-colored regions represent objects that are relatively close to the cameras and dark-colored regions represent objects that are relatively far from the cameras. The disparity map may be generated based on image data from a pair of cameras as described above. For example, the 3D coordinates ($x_w$, $y_w$, $z_w$) of a point P on the surface of an object in the environment can be determined by solving $$x_w = (u - u_0) \times \frac{b}{d}$$
$$y_w = (v - v_0) \times \frac{b}{d}$$
$$z_w = f \times \frac{b}{d}$$

where u, v represent the coordinates of P in the image data, $u_0$, $v_0$ represent the internal parameters of the cameras, f is the focal length, b is the distance between cameras, and d is the disparity between the paired image data.

Alternatively or in combination, other types of 3D digital reconstructions can also be used. For instance, an occupancy grid can be used to represent the spatial disposition of obstacles within the environment. The environment can be represented as a three-dimensional grid, with each location either being occupied by an obstacle, unoccupied, or unknown (e.g., due to insufficient or unreliable sensor data). In some embodiments, the occupancy grid can be generated based by combining data from vision sensors and proximity sensors. The occupancy grid can then be analyzed to determine various metrics (e.g., total occupied volume, total unoccupied volume, ratio of occupied to unoccupied space) that can be used to determine the environmental complexity factor.

In step 340, an environmental complexity factor is determined based on the 3D reconstruction. Any suitable technique can be used in order to determine the environmental complexity factor. For example, in some embodiments, the 3D reconstruction is used to calculate various obstacle-related statistics, such as the number of obstacles at each location within the environment. The calculated statistics can then be analyzed in order to determine the overall entropy of the environment, which may be related to the environmental complexity (e.g., a high entropy corresponds to a high environmental complexity factor, a low entropy corresponds to a low environmental complexity factor).

Various approaches can be used to identify obstacles in the 3D environmental reconstruction and/or the sensor data, such as computer vision and image recognition methods. For example, a feature extraction algorithm can be implemented in order to detect features (e.g., histogram of oriented gradients (HOG) features in image data, surface normal features in 3D point cloud data) indicative of an obstacle. Classification algorithms can be used to distinguish between obstacles and non-obstacles in the environmental reconstruction. In some embodiments, the environmental complexity analysis techniques described herein may utilize suitably trained machine learning algorithms and models to perform feature extraction and/or obstacle detection and classification.

Figure 5:
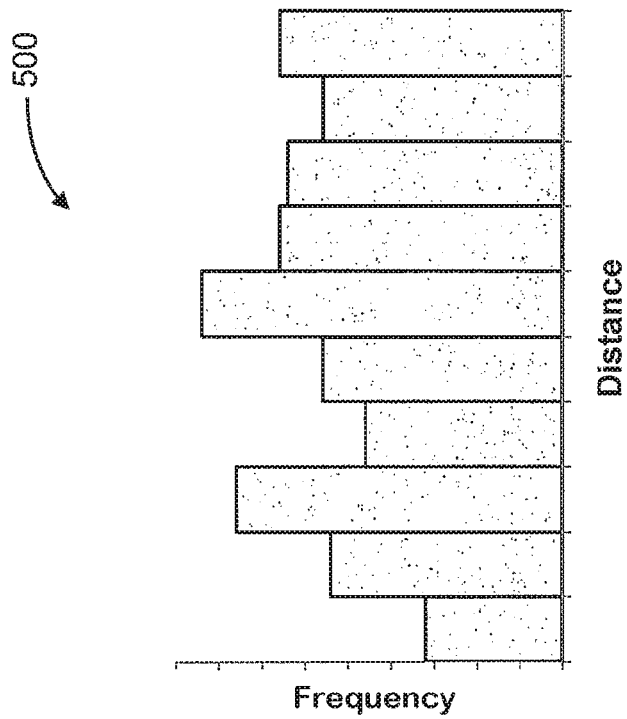
FIG. 5 illustrates a histogram indicative of obstacle density in an environment, in accordance with embodiments.

FIG. 5 illustrates a histogram 500 indicative of obstacle density in an environment, in accordance with embodiments. The histogram 500 can be generated based on a 3D environmental reconstruction, such as a 3D point cloud, 3D disparity map (e.g., the map 400 of FIG. 4), or a 3D occupancy grid, by determining the number of obstacles at each location in the reconstruction. In the depiction of FIG. 5, the histogram 500 provides a graphical representation of the obstacle frequency versus the distance from the UAV. The histogram distribution may vary based on the spatial disposition and distribution of obstacles within the environment. For instance, in situations where there is a relatively high obstacle density near the UAV, the obstacle frequency would be higher for the close distance histogram bins versus the long distance bins. Conversely, when the majority of obstacles are relatively far from the UAV, the obstacle frequency would be lower for the close distance bins compared to the long distance bins. Furthermore, in environments with low obstacle densities, the histogram 500 may have a relatively uniform distribution (e.g., low entropy), whereas high obstacle densities may result in the histogram 500 having a non-uniform distribution (e.g., high entropy). The characteristics and statistics of the histogram 500 (e.g., the distribution pattern, average, median, mode, entropy) may be used to determine the environmental complexity factor.

In step 350, one or more operating rules are determined based on the environmental complexity factor. The operating rules can be selected in order to provide appropriate limits, ranges, and/or values for various UAV operating parameters for an environment having a given complexity factor in order to minimize the potential for collisions with obstacles, as previously described herein. Additionally, suitable noise reduction methods can be applied during determination of the operating rules in order to avoid undesirable fluctuations in the control scheme caused by sensor noise or error. In some instances, the operating rules determined at sequential time points may vary substantially, e.g., due to noisy sensor data or limitations in sensor precision. To counteract this instability, the operating rules determined during a current time point can be compared to one or more operating rules determined during one or more previous time points. The current and previously determined operating rules can be combined (e.g., averaged) in order to generate a final set of operating rules that are applied to control the operation of the UAV. Alternatively or in combination, suitable filtering methods can be applied to reduce the "noisiness" of operating rule determination.

Figure 6:
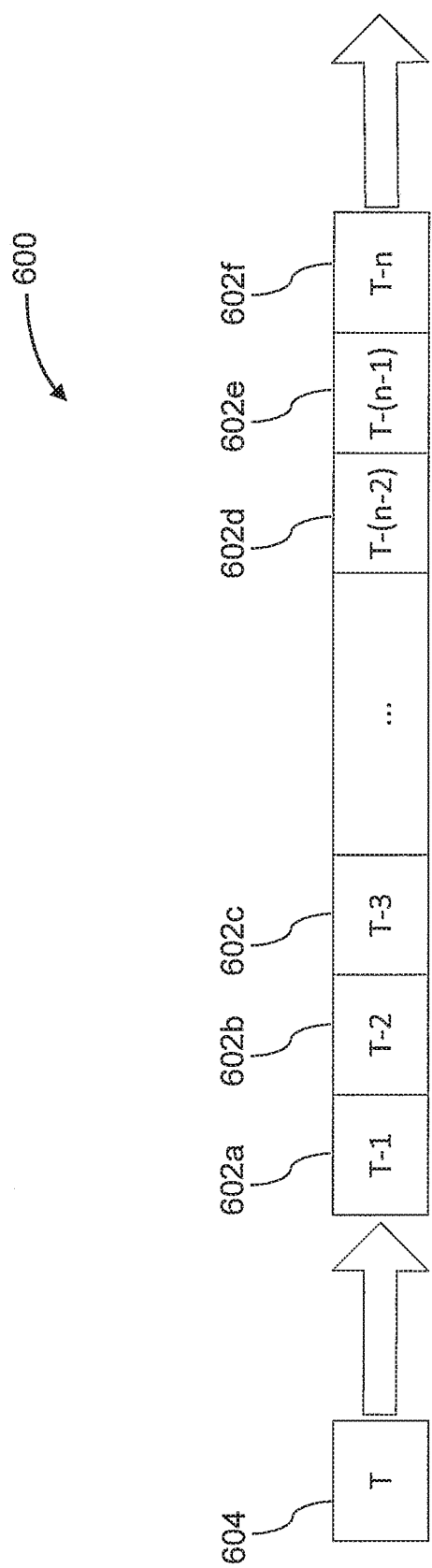
FIG. 6 illustrates a first-in-first-out queue for determining velocity rules, in accordance with embodiments.

FIG. 6 illustrates a first-in-first-out (FIFO) queue 600 for determining velocity rules, in accordance with embodiments. The FIFO queue 600 can be used to combine velocity rules determined at various time points during operation of the UAV in order to improve the stability of the UAV velocity control scheme. Although the FIFO queue 600 is presented in the context of velocity rules, the queue 600 can be applied to the determination of other types of operating rules, such as the embodiments previously described herein.

The queue 600 includes a plurality of previously determined velocity rules 602a-f, each determined at a corresponding time point prior to the current time point t. The queue 600 can store any number of previously determined velocity rules 602a-f, such as one, two, three, four, five, six, or more previously determined velocity rules. The previously determined velocity rules 602a-f can each be generated using any of the methods described herein and added sequentially to the queue 600. For instance, velocity rules 602b may have been added to the queue 600 at time t-2. Subsequently, velocity rules 602a may have been added to the queue 600 at point t-1. At the current time point t, the most current velocity rules 604 can be determined as described herein at the current time t and added to the queue 600. As the most current velocity rules 604 are added, the oldest set of velocity rules 602f can be removed from the queue 600. This process can be repeated during operation of the UAV such that the queue 600 is continuously updated to store the most recently determined velocity rules. The interval between each time point can be constant or may vary. For instance, the queue 600 can be updated approximately every 0.1 s to add newly determined velocity rules and remove the oldest velocity rules.

The velocity rules stored in the queue 600 can be combined in any suitable manner in order to determine the final velocity rules for controlling the UAV. In some embodiments, the final velocity rules are determined from a weighted average of the stored velocity rules. The weighted average may assign a greater weight to more recently determined velocity rules and a smaller weight to older velocity rules. For example, the following equation may be applied to determine a final velocity limit $V_f$:

$$V_f = 0.1 V_{t-4} + 0.15 V_{t-3} + 0.2 V_{t-2} + 0.25 V_{t-1} + 0.3 V_t$$

where $V_{t-4}$, $V_{t-3}$, $V_{t-2}$, $V_{t-1}$, and $V_t$ are the velocity limits determined at times t-4, t-3, t-2, t-1, and t, respectively.

In step 360, additional operating rules for the UAV are determined. The additional operating rules may be determined independently of the environmental complexity factor, and may therefore differ from the rules determined in step 350. The additional operating rules can include any embodiment of the operating rules presented herein. In some embodiments, the additional rules can be configured to ensure smooth and stable UAV flight. As previously mentioned, the UAV attitude may be related to UAV acceleration, such that as the UAV assumes a certain attitude when accelerating or decelerating to a specified velocity. However, extreme attitudes and/or sudden attitude changes may be undesirable for flight stability, power consumption, and certain UAV applications (e.g., aerial photography using a camera carried by the UAV). Rather, it may be preferable for the UAV to achieve a desired velocity by incremental or gradual acceleration resulting in more moderate UAV attitudes. Accordingly, suitable attitude rules such as an attitude limit and/or range for UAV operation can be determined in order to ensure smooth and stable UAV movements. The attitude rules can be varied as necessary in order to optimize the UAV attitude control scheme. An attitude limit may be less than or equal to approximately 35° relative to the vertical axis of the UAV. An attitude range may be within a range of 25° to 45° from the vertical axis. Similarly, suitable acceleration rules such as an acceleration limit and/or range can be determined to provide smooth UAV flight, which may be related to a corresponding attitude limit and/or range. Alternatively or in combination, appropriate UAV attitude (or acceleration) values can be determined by using low pass filters and/or other smoothing algorithms to reduce or eliminate sudden attitude changes (or acceleration changes). As another example, the systems and devices described herein can determine appropriate altitude rules such as an altitude range for the UAV. A UAV operating at high altitudes may be permitted to move at higher velocities than a UAV operating at low altitudes.

In step 370, the UAV is caused to operate (e.g., by one or more processors, or any other systems or devices described herein) while complying with the one or more operating rules and the other control rules. Similar to step 240 of the method 200, the UAV may receive signals indicating a desired movement, and may adjust the desired movement as necessary to ensure that the operating rules and/or control rules are observed. Furthermore, real-time sensor measurements can be used to monitor the UAV state and provide feedback to ensure that the UAV continues to obey the operating rules and/or other control rules.

Although some embodiments herein may present approaches for fully automated context-based determination of UAV operating rules, other embodiments may provide mechanisms for receiving user input indicative of user preferences for the UAV control scheme. For example, a user operating the UAV may, based on their own judgment regarding the current flight environment and obstacle density, determine a set of desired operating rules for operating the UAV. Accordingly, embodiments herein may utilize user input in addition to environmental considerations such as the environmental complexity factor when determining an appropriate set of operating rules.

Figure 7:
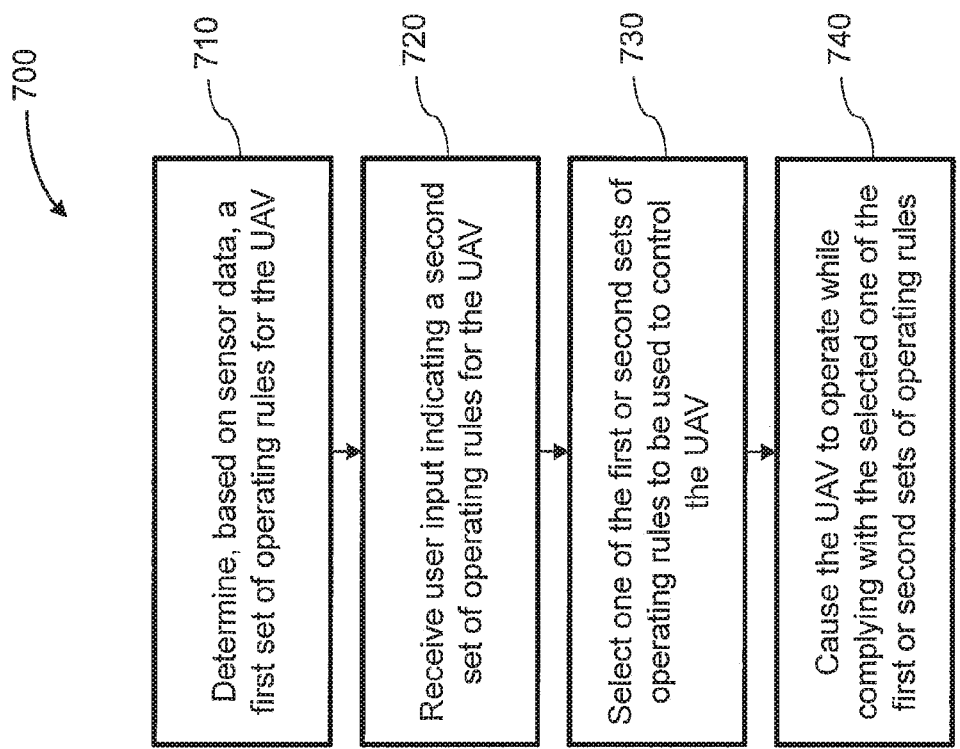
FIG. 7 illustrates a method for controlling a UAV, in accordance with embodiments.

FIG. 7 illustrates a method 700 for controlling a UAV, in accordance with embodiments. The steps of the method 700 can be combined with or substituted for any of the steps of the other methods provided herein. Additionally, any step of the method 700 can be repeated, omitted, or combined with other steps as desired. One or more steps of the method 700 can be performed in real-time during operation of the UAV.

In step 710, a first set of operating rules for the UAV are determined based on sensor data, using any of the techniques presented herein.

In step 720, user input indicating a second set of operating rules for the UAV is received. The user may provide input data that defines or selects the second set of operating rules for the UAV. Optionally, rather than directly inputting the operating rules, the user may indicate a preferred flight mode that is associated with a set of operating rules, as previously described herein. For instance, a user may be able to select a low velocity flight mode, an intermediate velocity flight mode, or a high velocity flight mode. Similarly, indoor and outdoor flight modes may also be associated with distinct operating rules. The user inputs for selecting the operating rules and/or flight mode may be provided to the UAV via a suitable remote controller (also referred to herein as a "terminal"), mobile device, or other input device in communication with the UAV. Accordingly, when desired, the user can transmit commands to the UAV indicating a preferred control scheme.

Figure 8:
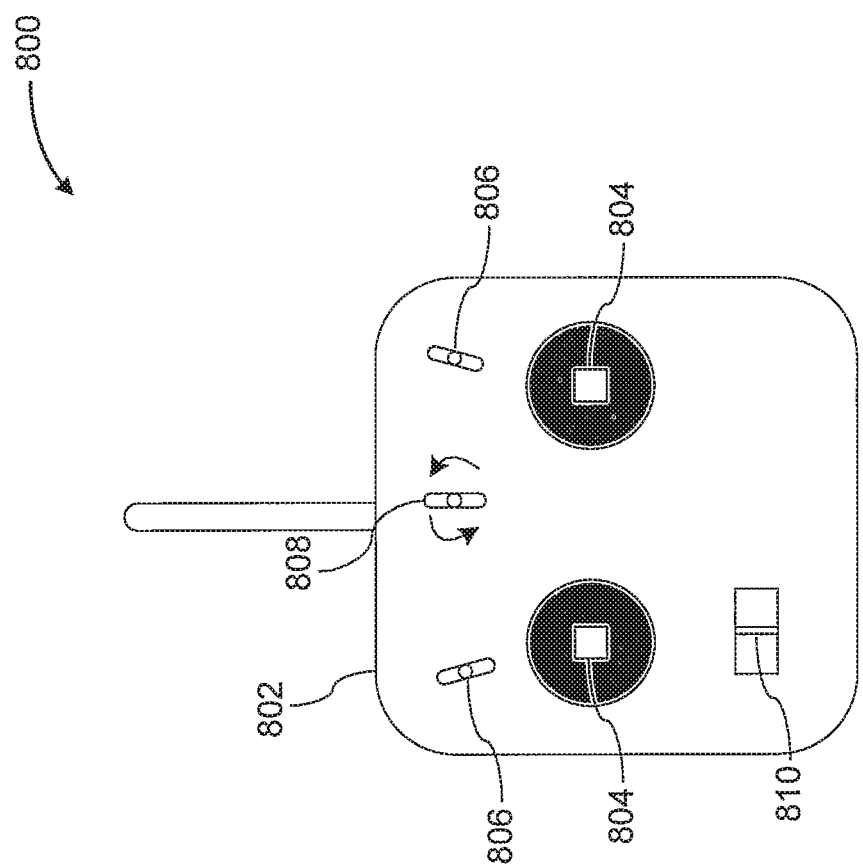
FIG. 8 illustrates a remote controller for controlling an unmanned aerial vehicle, in accordance with embodiments.

FIG. 8 illustrates a remote controller 800 for controlling a UAV, in accordance with embodiments. The remote controller 800 can include a controller body 802 sized to held by a user. One or more joysticks 804 can be mounted on the body 802 and used as input mechanisms for controlling the spatial disposition of the UAV. The body 802 can also include other types of input mechanisms, such as one or more switches 806, a knob 808, and/or a slide switch 810. Optionally, alternative input mechanisms such as buttons, dials, touchscreens, keypads, voice controls, gesture controls, inertial sensors to detect the tilt and/or attitude of the controller 800, etc. can also be used. The input mechanisms can be manually set by a user to one or more positions, each of the positions corresponding to a predetermined input for controlling the UAV. For example, the knob 808 can be turned (e.g., along a counterclockwise direction as indicated by the arrows) to a plurality of stops each representing a different respective input value.

In some embodiments, the input mechanisms can be manipulated by a user to input user-preferred operating rules and/or flight modes. For instance, each stop of the knob 808 may correspond to a flight mode associated with a set of operating rules. The user can turn the knob 808 to the appropriate stop in order to indicate the desired flight mode for operating the UAV. Similarly, the user may use other input mechanisms such as the switches 806 and/or 810 in order to select a flight mode. Additionally or in combination, the user input can be provided using other types of devices besides the remote controller 800. For example, the UAV may be in communication with a mobile device (e.g., smartphone) running suitable mobile application software ("app") that can generate control instructions for the UAV. The app may be configured to obtain inputs from a user indicating the desired operating rules. The user may directly input the operating rules, or may select a flight mode associated with a set of operating rules, as described above.

In step 730, one of the first or second sets of operating rules is selected to be used to control the UAV. In situations where the environmental complexity factor suggests a first set of operating rules and the user input indicates a second, different set of operating rules, suitable approaches can be applied to select one of the two sets for use in controlling the UAV. For example, some embodiments herein may preferentially select the "safest" set (e.g., the set that is least likely to result in collisions with obstacles). If the user specifies a first velocity limit $\mu_A$ and the determined environmental complexity factor corresponds to a second velocity limit $\mu_B$, the actual velocity limit $\mu$ to be used may be determined by selecting the smaller of the two velocity limits (e.g., $\mu = \min(\mu_A, \mu_B)$).

In step 740, the UAV is caused to be operated while complying with the selected one of the first or second sets of operating rules, as previously described herein.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
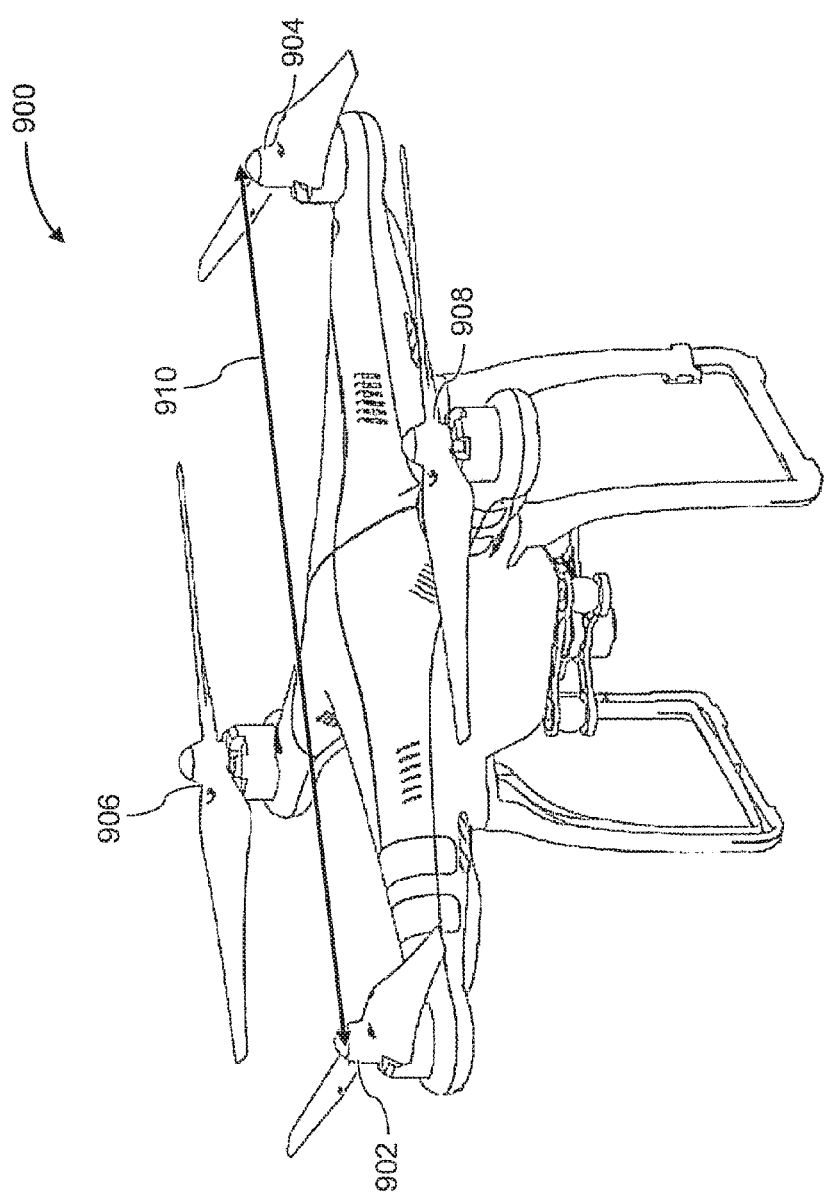
FIG. 9 illustrates an unmanned aerial vehicle, in accordance with embodiments.

FIG. 9 illustrates a UAV 900, in accordance with embodiments of the present invention. The UAV may be an example of a movable object as described herein. The UAV 900 can include a propulsion system having four rotors 902, 904, 906, and 908. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
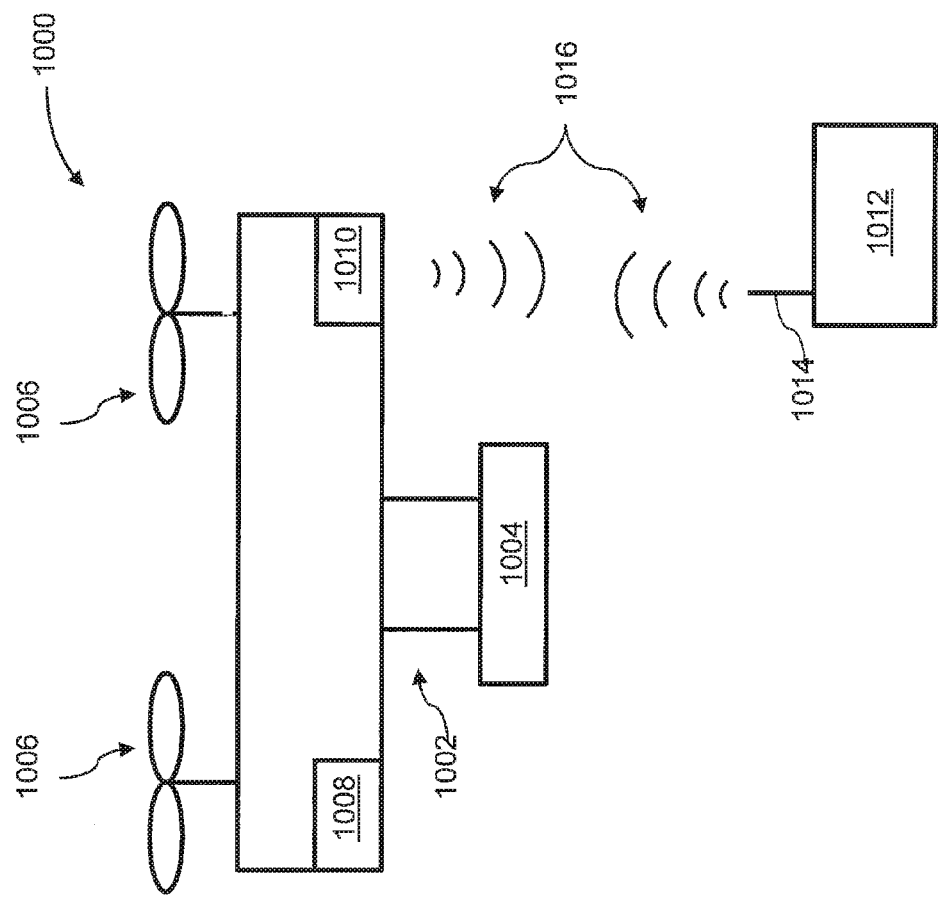
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanism 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
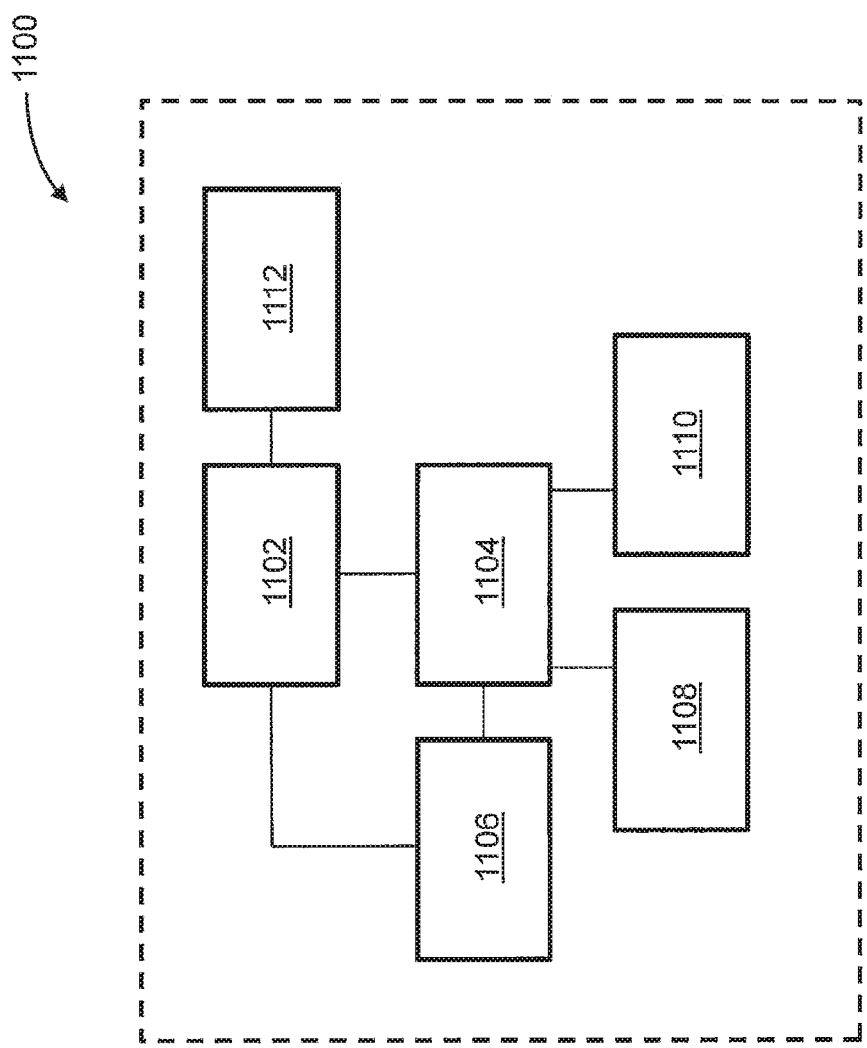
FIG. 11 illustrates a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for controlling an unmanned aerial vehicle within an environment, the system comprising:
   one or more sensors carried on the unmanned aerial vehicle; and
   one or more processors individually or collectively configured to:
      determine, based on data from the one or more sensors, an environmental complexity factor representative of an obstacle density for the environment,
      determine, based on the environmental complexity factor, a first set of operating rules for the unmanned aerial vehicle,
      detect, based on data from the one or more sensors, a change in the environmental complexity factor corresponding to a change in the obstacle density for the environment, and
      modify the first set of operating rules based on the change in the environmental complexity factor to provide a second set of operating rules for the unmanned aerial vehicle.

2. The system of claim 1, wherein the one or more sensors comprise at least one of the following: a vision sensor, a lidar sensor, or an ultrasonic sensor.

3. The system of claim 1, wherein the one or more sensors comprise a plurality of different sensor types.

4. The system of claim 1, wherein the one or more sensors are configured to receive the data, and wherein the data is indicative of the obstacle density for the environment.

5. The system of claim 1, wherein the environmental complexity factor is determined based on a three-dimensional digital representation of the environment generated using the sensor data.

6. The system of claim 5, wherein the three-dimensional digital representation comprises a three-dimensional point cloud or an occupancy grid.

7. The system of claim 1, wherein the first set of operating rules comprises a first set of velocity rules and the second set of operating rules comprises a second set of velocity rules.

8. The system of claim 7, wherein at least one of the first and second sets of velocity rules is determined based on a minimum braking distance for the unmanned aerial vehicle.

9. The system of claim 7, wherein the first and second sets of velocity rules each comprise a velocity limit for the unmanned aerial vehicle.

10. The system of claim 9, wherein when the change in the environmental complexity factor corresponds to a decrease in the obstacle density, the velocity limit of the second set of velocity rules is greater than the velocity limit of the first set of velocity rules.

11. A method for controlling an unmanned aerial vehicle within an environment, the method comprising:
   receiving, with aid of a processor, sensor data of the environment from one or more sensors carried on the unmanned aerial vehicle;
   determining, based on the sensor data, an environmental complexity factor representative of an obstacle density for the environment,
   determining, based on the environmental complexity factor and with aid of the processor, a first set of operating rules for the unmanned aerial vehicle,
   detecting, based on the sensor data, a change in the environmental complexity factor corresponding to a change in the obstacle density for the environment, and
   modifying the first set of operating rules based on the change in the environmental complexity factor to provide a second set of operating rules for the unmanned aerial vehicle.

12. The method of claim 11, wherein the one or more sensors comprise at least one of the following: a vision sensor, a lidar sensor, or an ultrasonic sensor.

13. The method of claim 11, wherein the one or more sensors comprise a plurality of different sensor types.

14. The method of claim 11, wherein the sensor data is indicative of the obstacle density for the environment.

15. The method of claim 11, further comprising the environmental complexity factor is determined based on a three-dimensional digital representation of the environment generated using the sensor data.

16. The method of claim 15, wherein the three-dimensional digital representation comprises a three-dimensional point cloud or an occupancy grid.

17. The method of claim 11, wherein the first set of operating rules comprises a first set of velocity rules and the second set of operating rules comprises a second set of velocity rules.

18. The method of claim 17, wherein at least one of the first and second sets of velocity rules is determined based on a minimum braking distance for the unmanned aerial vehicle.

19. The method of claim 17, wherein the first and second sets of velocity rules each comprise a velocity limit for the unmanned aerial vehicle.

20. The method of claim 19, wherein when the change in the environmental complexity factor corresponds to a decrease in the obstacle density, the velocity limit of the second set of velocity rules is greater than the velocity limit of the first set of velocity rules.

* * * * *